United States Patent [19]
Hosogai

[11] Patent Number: 5,499,110
[45] Date of Patent: Mar. 12, 1996

[54] IMAGE PROCESSING APPARATUS FOR SYNTHESIZING DIFFERENT INPUT DATA WITHOUT USING HARD COPY

[75] Inventor: Takashi Hosogai, Tokyo, Japan

[73] Assignee: Ricoh Company, Ltd., Tokyo, Japan

[21] Appl. No.: 22,093

[22] Filed: Feb. 25, 1993

[30]    Foreign Application Priority Data

Feb. 28, 1992 [JP] Japan ................................. 4-043636

[51] Int. Cl.⁶ ........................... H04N 1/387; H04N 1/32; H04N 1/46; G06K 1/00
[52] U.S. Cl. .................... 358/450; 358/540; 358/468; 358/452; 395/114; 395/115
[58] Field of Search ........................ 358/540, 450, 358/462, 468, 452; 382/302; 395/114, 115, 135, 147; H04N 1/21, 1/387

[56]              References Cited

U.S. PATENT DOCUMENTS

| | | | |
|---|---|---|---|
| 4,538,183 | 8/1985 | Kanno et al. | 358/452 |
| 5,191,440 | 3/1993 | Levine | 358/450 |
| 5,267,333 | 11/1993 | Aono et al. | 358/450 |

FOREIGN PATENT DOCUMENTS 3411939  10/1984  Germany .
3438075  5/1985  Germany .
0074740  5/1987  Japan .................................. 358/450

*Primary Examiner*—Edward L. Coles, Sr.
*Assistant Examiner*—Kimberly A. Williams
*Attorney, Agent, or Firm*—Popham, Haik, Schnobrich & Kaufman, Ltd.

[57]              ABSTRACT

An image processing apparatus includes a plurality of input units for supplying a plurality of input data of different image information, a first selecting part for selecting one of the plurality of input units, a first memory for storing input data supplied from the selected input unit, a first display part for displaying the input data stored in the first memory, a processing part for processing input data in the first memory so that processed data is produced, a second memory for storing the processed data, the stored data having less than a one-page storage size, a second display part for displaying the processed data stored in the second memory, a plurality of output units each of which records or outputs the processed data to an external medium, a second selecting part for selecting one of the plurality of output units, and a control part for repeating the selection of one input unit and the storing of input data in the first memory so that two or more pieces of processed data are produced, and for allowing the pieces of processed data to be stored in the second memory so that a composite image is supplied to the selected output unit.

7 Claims, 12 Drawing Sheets

FIG. 3

INPUT DATA

TITLE: PERSONAL SALES

DATA:

|   | SATO | FUJI-MURA | SUZUKI | TANAKA | NAKA-MURA |
|---|------|-----------|--------|--------|-----------|
| A | 12   | 9         | 15     | 11     | 17        |
| B | 21   | 8         | 18     | 17     | 13        |
| C | 20   | 10        | 14     | 19     | 24        |

MAX VALUE: 80

MIN VALUE: 0

UNIT WIDTH: 20

GRAPH NUMBER: 6

UNIT: MILLION

FIG.6C

There are many approaches in
the desktop publishing (DTP) market
in Japan, and the greater majority
of the approaches is the hardware
systems which are highly integrated
systems.
   The DTP systems are personal
computers, wordprocessors and
workstations. It is expected that
the sales of DTP systems in Japan
are more and more increasing.
The price of one DTP system having
a page editing wordprocessor
function is decreased to a level
equivalent to that for the personal
use.

INPUT UNITS
OUTPUT UNITS
INPUT IMAGE
OUTPUT IMAGE
IMAGE TRANSFER

FIG.6D

INPUT UNITS
OUTPUT UNITS
INPUT IMAGE
OUTPUT IMAGE
IMAGE TRANSFER

There are many approaches in
the desktop publishing (DTP) market
in Japan, and the greater majority
of the approaches is the hardware
systems which are highly integrated
systems.
   The DTP systems are personal
computers, wordprocessors and
workstations. It is expected that
the sales of DTP systems in Japan
are more and more increasing.
The price of one DTP system having
a page editing wordprocessor
function is decreased to a level
equivalent to that for the personal
use.

IMAGE PROCESSING APPARATUS FOR SYNTHESIZING DIFFERENT INPUT DATA WITHOUT USING HARD COPY

BACKGROUND OF THE INVENTION

The present invention relates to an image processing apparatus in which a plurality of input data from different input units are synthesized and an output image in which the plurality of input data are synthesized is recorded to a recording medium.

There are several image processing apparatuses which have a capability to synthesize a plurality of input data to an image, so that the image is output to a recording medium. In a conventional image processing apparatus of the type described above, a scanner is used to read input data from an original document, and a printer is used to record output data to a recording medium. In this conventional apparatus, two or more pieces of input data are synthesized to an output image by means of the synthesizing capability, and the output image in which the pieces of input data are included is printed to a recording medium.

However, in the above described conventional apparatus, when input data from a text/graphic data file produced by a wordprocessor or the like is combined with another input data, it is necessary to produce a hard copy of the data file by printing input data of the data file to a recording sheet by using the printer of the apparatus. It is also necessary to read the input data from the hard copy by using the scanner of the apparatus before the synthesizing process is carried out.

Therefore, the above described conventional apparatus has a problem in that the hard copy produced before the synthesizing is wasteful, and that the picture quality of the output image will deteriorate since a copy of the original data is produced and the intermediate data read from the copy is used in the synthesizing process.

SUMMARY OF THE INVENTION

Accordingly, it is a general object of the present invention to provide an improved image processing apparatus in which the above described problems are eliminated.

Another, more specific object of the present invention is to provide an image processing apparatus in which a plurality of input data from different input units are synthesized to a composite image with no need of using intermediate data read from a hard copy, so that the composite image is recorded or output to one of a plurality of output units. The above mentioned object of the present invention is achieved by an image processing apparatus which includes a plurality of input units for supplying a plurality of input data of different image information, an input unit selecting part for selecting one input unit from the plurality of input units, a first memory part for storing input data supplied from the input unit selected by the input unit selecting part, a first display part for displaying the input data stored in the first memory part, a processing part for processing input data in the first memory part so that processed data is produced, a second memory part for storing the processed data of the processing part, the stored data having less than a one-page storage size, a second display part for displaying the processed data stored in the second memory part, a plurality of output units each of which records or outputs the processed data in the second memory part to an external medium, an output unit selection part for selecting one output unit from the plurality of output units, and a control part for repeating the selection of one input unit by the input unit selecting part and the storing of input data of image information by the first memory part so that the processing part produces two or more pieces of processed data, and for allowing the pieces of processed data to be stored in the second memory part so that a composite image containing the pieces of processed data of the second memory part is supplied to the output unit selected by the output unit selecting part.

According to the present invention, it is not necessary to produce a hard copy before the synthesizing, and intermediate data read from a hard copy is not used for carrying out the synthesizing process. It is thus possible to prevent the picture quality of the output image from deteriorating due to the use of the intermediate data read from a copy of the original data in the synthesizing process.

Other objects and further features of the present invention will become apparent from the following detailed description when read in conjunction with the accompanying drawings.

BRIEF DESCRIPTION OF THE DRAWINGS

FIG. 3 is a diagram showing an input reading sheet in which input data is manually written, the sheet being read by a scanner of the apparatus shown in FIG. 2;

FIGS. 6A through 6F are diagrams for explaining processes performed by the apparatus shown in FIG. 2 in which input data is read from a wordprocessor data list and it is stored;

DESCRIPTION OF THE PREFERRED EMBODIMENT

Figure 1:
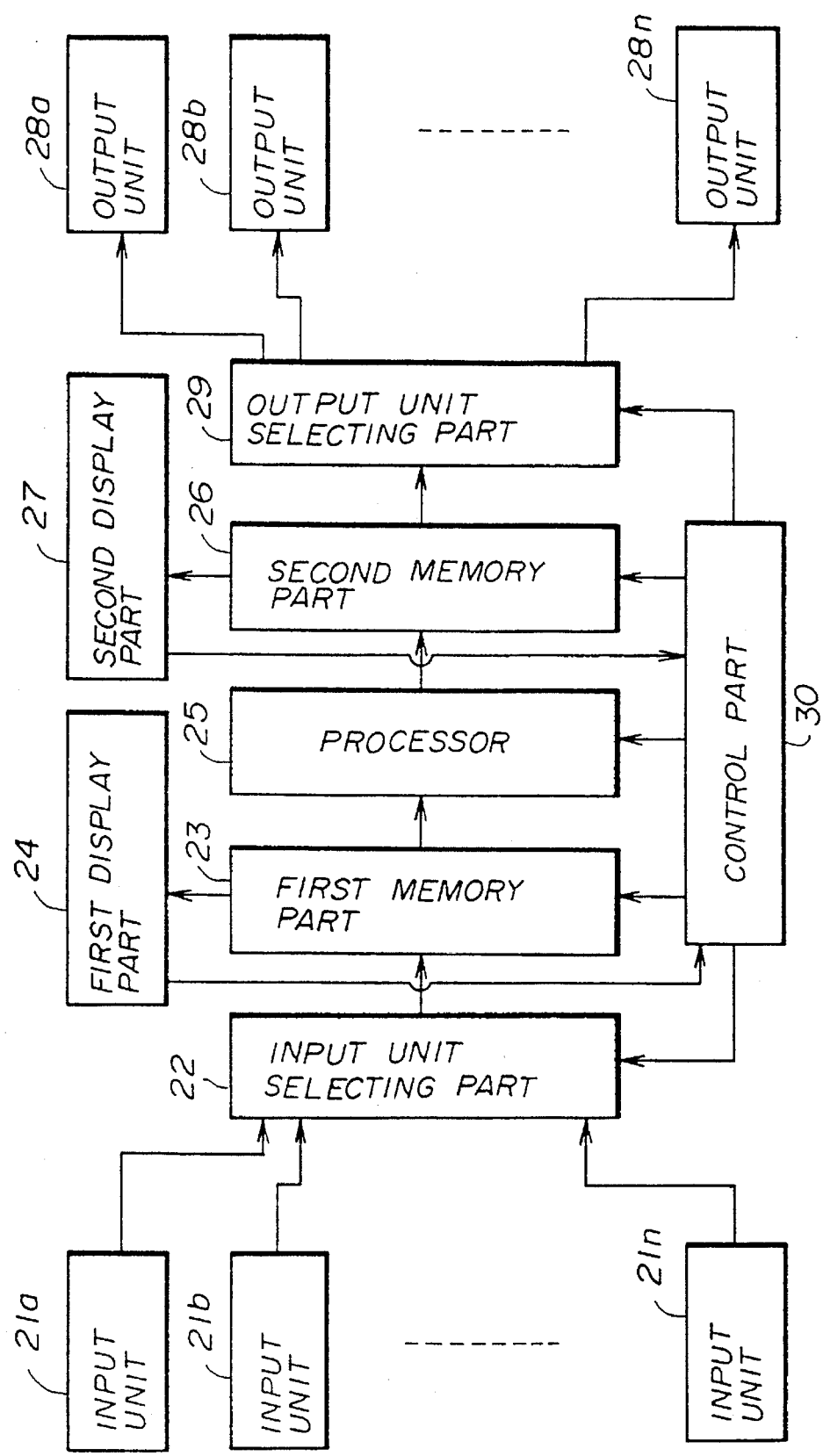
FIG. 1 is a block diagram showing an image processing apparatus according to the present invention.

A description will be given of an image processing apparatus according to the present invention, with reference to FIG. 1. FIG. 1 shows a construction of the image processing apparatus according to the present invention. In the apparatus shown in FIG. 1a, a plurality of input units 21a, 21b, . . . 21n supplies a plurality of input data of different image information to the apparatus. An input unit selecting part 22 selects one input unit 10 from the plurality of input units. In a first memory part 23, input data supplied from the input unit selected by the input unit selecting part 22 is stored. A first display part 24 displays the input data stored in the first memory part 23 on a CRT screen. A processing part 25 carries out an image processing for input data of the first memory part 23 so that processed data is produced from the input data. In a second memory part 26, the processed data of the processing part 25 is stored, the stored data having less than a one-page storage size. A second display part 27 displays the processed data stored in the second memory part 26. A plurality of output units 28a, 28b, ..., 28n each outputs the processed data of the second memory part 26 to a recording medium or an external unit. An output unit selecting part 29 selects one output unit from the plurality of output units. In the image processing apparatus according to the present invention, a control part 30 repeats the selection of one input unit by the input unit selecting part 22 and the storing of input data of image information by the first memory part 23 so that the processing part 25 produces two or more pieces of processed data. The control part 30 allows the pieces of processed data to be stored in the second memory part 27 so that a composite image containing the pieces of processed data of the second memory part 27 is supplied to the output unit selected by the output unit selecting part 29.

According to the image processing apparatus shown in FIG. 1a, the control part 30 repeats the selection of one input unit from the input units and the storing of input data in the first memory part 23 so that the processing part 25 produces two or more pieces of processed data. Thus, it is possible to produce a composite image in which several pieces of input data from different input units are processed and the processed data are synthesized. It is possible to output the thus produced composite image to a recording medium or an external unit by selecting one of the plurality of output units.

Figure 2:
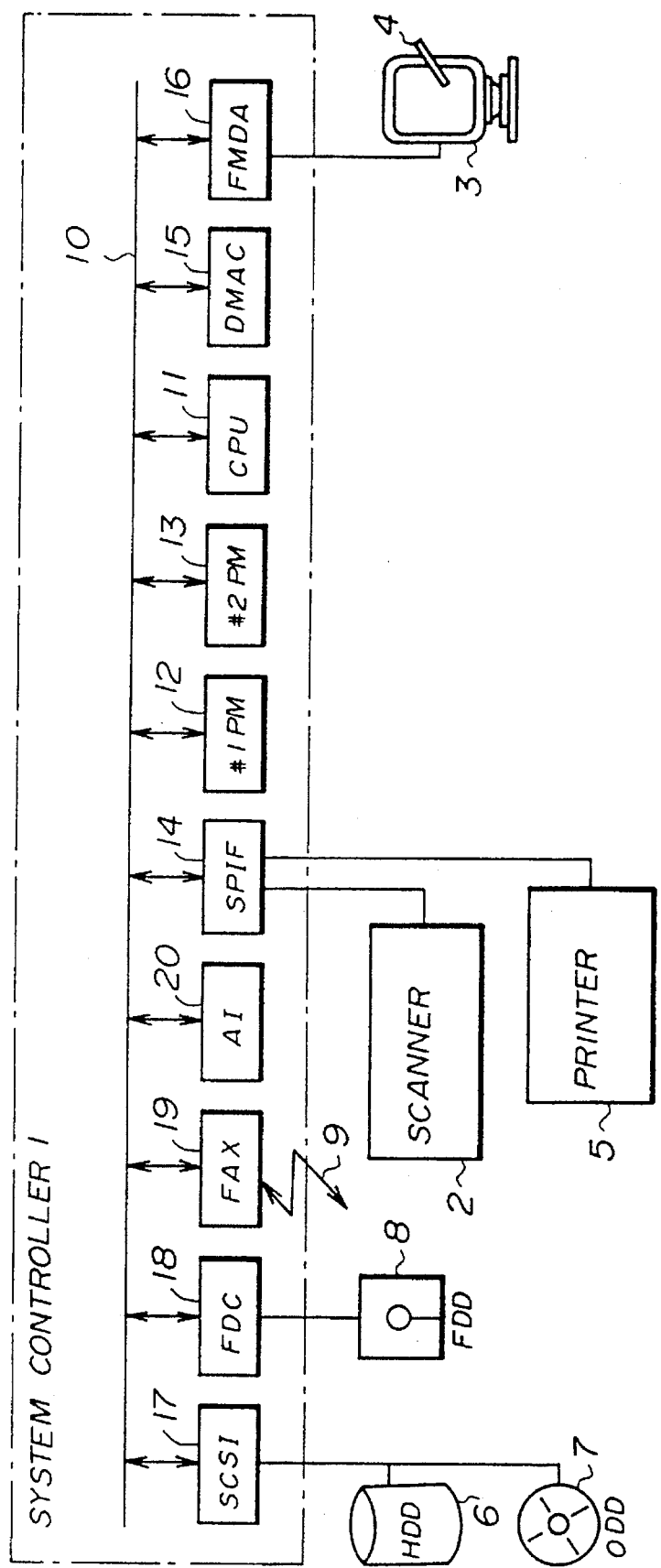
FIG. 2 is a system diagram showing a preferred embodiment of an image processing apparatus according to the present invention.

Next, a description will be given, with reference to FIG. 2, of a preferred embodiment of the image processing apparatus according to the present invention. FIG. 2 shows an image processing apparatus including a system controller 1, a scanner 2, a CRT (cathode ray tube) display 3, a light pen 4, a printer 5, a magnetic hard disk drive (HDD) unit 6, an optic disk drive (ODD) unit 7, a floppy disk drive (FDD) unit 8 and a transmission line 9.

The controller 1 of the image processing apparatus shown in FIG. 2 includes a system bus 10 and various function boards 11 through 20 coupled to the system bus 10. A central processing unit (CPU) board 11 controls operations of the other function boards 12 through 20 by sending and receiving signals via the system bus 10. Each of a first page memory (#1 PM) board 12 and a second page memory (#2 PM) board 13 is a buffer memory of the image processing apparatus for storing one page of image data, the stored image data being output to the other boards via the system bus 10. The page memory boards 12 and 13 (#1 PM and #2 PM) mentioned above respectively correspond to the first memory part 23 and the second memory part 26 of the image processing apparatus of the present invention shown in FIG. 1.

In the embodiment of the image processing apparatus shown in FIG. 2, the first page memory board 12 and the second page memory board 13 are connected to the scanner 1 and to the printer 5 via a SPIF (scanner and printer interface) board 14. Image data which is read out by the scanner 1 is stored in the memory boards 12 and 13, and the image data stored in the memory boards 12 and 13 are printed by the printer 5. The first and second page memory boards 12 and 13 are connected to the HDD unit 6 and to the ODD unit 7 via a SCSI (small computer systems interface) board 17. The first and second page memory boards 12 and 13 are connected to the FDD unit 8 via a FDC (floppy disk controller) board 18. The first and second page memory boards 12 and 13 are connected to the transmission line 9 via a FAX (facsimile) board 19.

When image data is read out by the scanner 1 via the SPIF board 14, it is possible that the image data is processed by an AI (artificial intelligence) board 20, and that the processed data is transferred from the AI board 20 to the first page memory board 12 via the system bus 10.

The SCSI board 17 shown in FIG. 2 has a capability of compressing image data received via the system bus 10 before the image data is written to the HDD unit 6 or the ODD unit 7. The SCSI board 17 also has a capability of decompressing a compressed image data when the compressed image data is read out from either of the HDD unit 6 and the ODD unit 7, so that the reconstructed image data is available to the system bus 10.

The FDC board 18 shown in FIG. 2 controls operations of the FDD unit 8 so that data is read out from a floppy disk inserted in the FDD unit 8, and that the data is transferred to either of the first and second page memory boards 12 and 13 via the system bus 10. In the floppy disk inserted in the FDD unit 8, a document/image data file which is produced by means of a wordprocessor is recorded, and such image data is processed by the image processing apparatus shown in FIG. 2.

The FAX board 19 uses an internal CCU (communication control unit) to carry out facsimile communication capabilities so that facsimile data is transmitted and received via the transmission line 9. The FAX board 19 has a capability of decoding the received facsimile data from the transmission line 9 into image data so that the image data is processed by the image processing apparatus, and has a capability of encoding the processed image data into facsimile data so that the facsimile data is transmitted to an external facsimile machine via the transmission line 9.

The AI board 20 shown in FIG. 2 has a character recognition capability and a graphic data processing capability. An input reading sheet in which numeral characters of input data are manually written as shown in FIG. 3 is read by the scanner 2.

Figure 4:
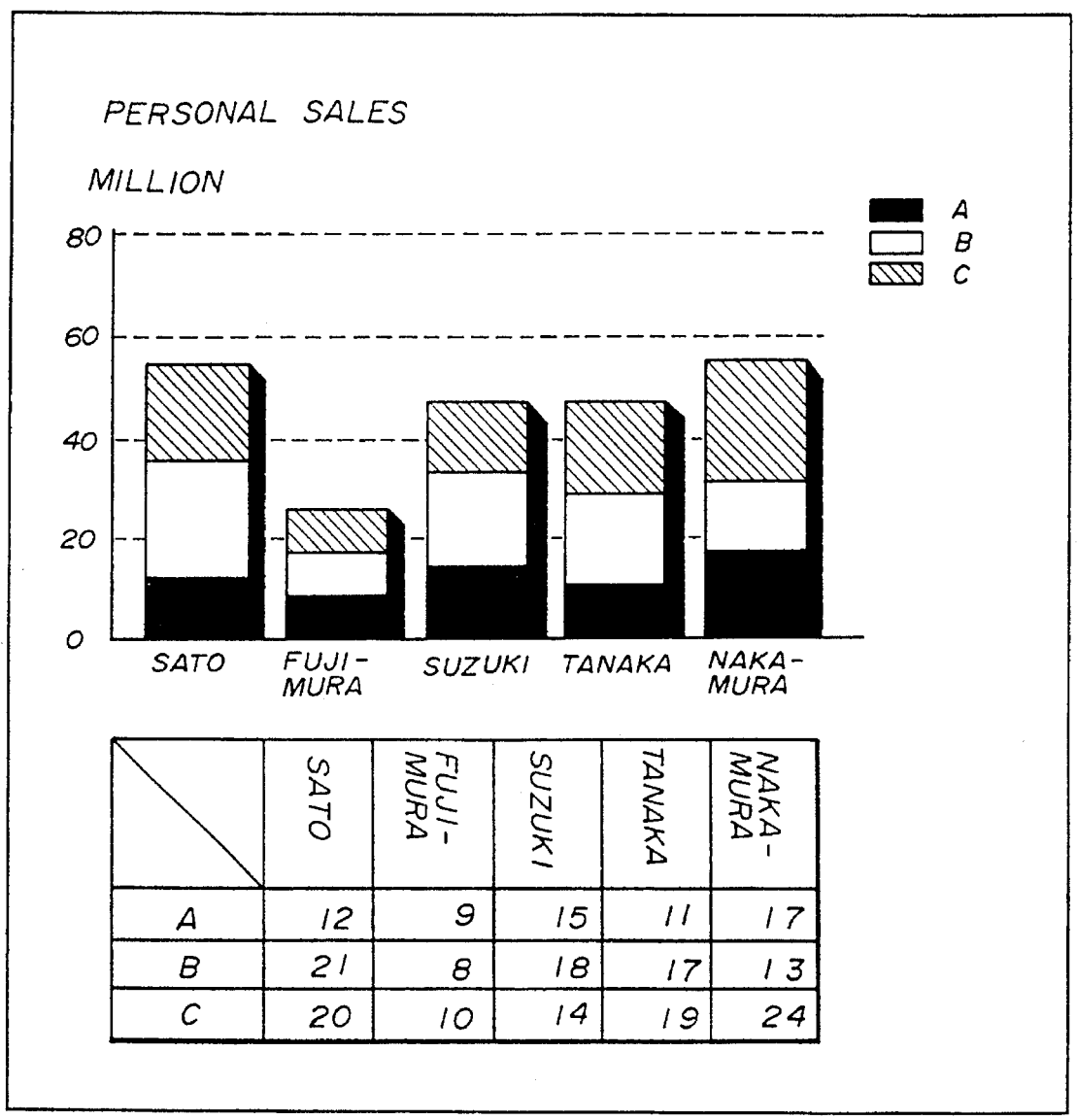
FIG. 4 is a diagram showing a graphic record of the input data which graphic record is produced from the input reading sheet shown in FIG. 3.

The AI board 20 recognizes the input data from the image data being read from the input reading sheet, and produces image data indicating a graphic record, as shown in FIG. 4, from the recognized input data. The graphic record is, as shown in FIG. 4, accompanied by the results of recognition of the input data (the manually written numerals) from the input reading sheet.

A DMAC (direct memory access controller) board 15 of the image processing apparatus shown in FIG. 2 serves to read out data from either of the first and second page memory boards 12 and 13, and transfer the data to a frame memory of a FMDA (frame memory and digital-to-analog converter) board 16 so that the data is displayed on the screen of the CRT display 3. When the data is transferred to a frame memory of the FMDA board 16, a certain bit of image data from either of the first and second page memory boards 12 and 13 is eliminated and a reduced amount of the image data is written to the frame memory of the FMDA board 16.

The FMDA board 16 includes a DA (digital-to-analog) converter in addition to the frame memory, and the DA converter of the FMDA board 16 converts digital signals into analog data so that the analog data is displayed on the screen of the CRT display 3. The CRT display 3 is provided with the light pen 4, and the CRT display 3 includes a tablet on the CRT screen. Coordinates of a location on the CRT screen as specified by the light pen 4 are recognizable by means of the tablet. Signals indicative of the coordinates of the specified location on the CRT screen are transferred to the CPU board 11 through the FMDA board 16. Instead of the light pen 4, another pointing device such as a mouse may be used with the CRT display 3.

Figure 5:
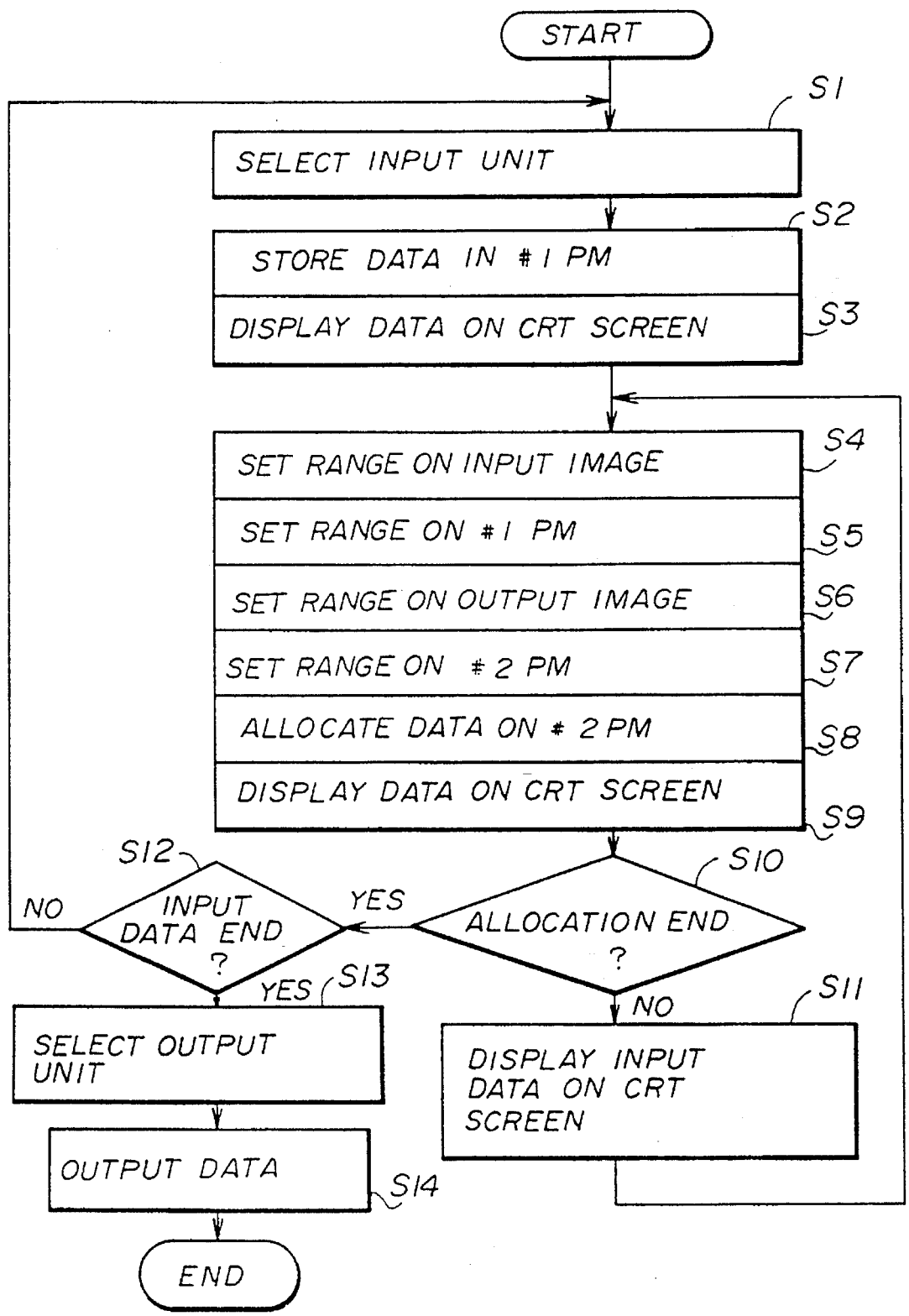
FIG. 5 is a flow chart for explaining a procedure of operations to have the apparatus shown in FIG. 2 carry out a synthesizing process.

Next, a description will be given, with reference to FIG. 5, of operations of the image processing apparatus shown in FIG. 2. FIG. 5 shows a procedure of operations made by an operator to have the image processing apparatus carry out an image processing. Each operation of the operator's operation procedure shown in FIG. 5 will be described in the following.

(S1) Selection of Input Unit

One input unit is selected from a plurality of input units appearing on the right-hand, sub screen of the CRT display 3 by using the light pen 4. An "input units" frame is selected by using the light pen 4 from among a plurality of frames appearing on the sub screen of the CRT display 3, and only the background and character luminance of the selected frame are inverted. The other frames ("output units" "input image" "output image" and "image transfer") remain at the normal background and character luminance on the sub screen of the CRT display 3.

After the "input units" frame is selected, a list of several input units, which list includes "scanner data", "AI data", "FAX data", "wordprocessor (W/P) data" and "image file data" input units, appears on the left-hand, main screen of the CRT display 3. If one input unit is selected from the list on the main screen of the CRT display 3 by using the light pen 4, the background and character luminance of the selected frame are inverted. The other frames remain at the normal background and character luminance on the main screen of the CRT display 3. If either the "wordprocessor data" or the "image file data" is selected by using the light pen 4, a list of data files corresponding to the selected frame appears on the main screen of the CRT display 3, instead of the previous input unit list. One data file can be selected from the list by using the light pen 4.

(S2) Storing Data in First Page Memory

Image data corresponding to the selected input unit is transferred to and stored in the buffer memory of the first page memory board 12.

(S3) Displaying Data on CRT Display

The image data stored in the buffer memory of the first page memory board 12 is transferred by the DMAC board 15 to the frame memory of the FMDA board 16 so that the image data of the selected input unit is displayed on the main screen of the CRT display 3. The background and character luminance of the "input image" frame is inverted, but the other frames are at the normal luminance on the CRT display 3.

(S4) Setting Range on Input Image

Two points in the input image on the main screen of the CRT display 3 are set by means of the light pen 4, and a cursor indicating a rectangular area specified by the two points appears in the input image displayed on the screen of the CRT display 3.

(S5) Setting Range on First Page Memory

In accordance with image data in the buffer memory of the first page memory board 12, corresponding to the rectangular area of the cursor on the main screen of the CRT display 3, a horizontal length X1 of the rectangular area and a vertical length Y1 thereof are calculated. The start and end addresses of the image data in the buffer memory of the first page memory board 12 corresponding to the rectangular area (which is an input region), and the lengths X1 and Y1 of the rectangular area are stored in a memory of the CPU board 11.

(S6) Setting Range on Output Image

The "output image" frame on the right-hand, sub screen of the CRT display 3 is set by using the light pen 4, the background and character luminance for the selected frame are inverted. The other frames including the "input image" frame are at the normal background and character luminance on the sub screen of the CRT display 3. Image data in the buffer memory of the second page memory board 13 is transferred to the frame memory of the FMDA board 16 so that the output image data is displayed on the main screen of the CRT display 3. A cursor which is the same as that of the input image also appears on the main screen of the CRT display 3 together with the output image data.

By drawing the light pen 4 in contact with the cursor on the main screen of the CRT display 3 to a desired location in the main screen, the rectangular area of the output image to which the input data extracted from the input unit is transferred can be determined. By performing this operation with the light pen 4, the extracted input data is allocated to the output image.

(S7) Setting Range on Second Page Memory

In accordance with the size of image data in the buffer memory of the second page memory board 13 corresponding to the rectangular area of the output image, a horizontal length X2 of the rectangular area and a vertical length Y2 thereof are calculated. The start and end addresses of image data in the buffer memory of the second page memory board 13 corresponding to the rectangular area (which is an output region), and the lengths X2 and Y2 of the rectangular area are stored in the memory of the CPU board 11.

(S8) Allocate Data on Second Page Memory

The "image transfer" frame is selected by using the light pen 4, and the background and character luminance for the "image transfer" frame are inverted. The input data in the first page memory board 12 (in the rectangular area) is enlarged or reduced in accordance with the ratio of X2/X1 in horizontal direction and in accordance with the ratio of Y2/Y1 in vertical direction. The output data is 10 updated by transferring the enlarged or reduced image data in the buffer memory of the first page memory board 12 to the buffer memory of the second page memory board 13. When the updating of the output data is completed, the "image transfer" frame is changed to the normal luminance.

(S9) Displaying Data on CRT Display

The image data in the buffer memory of the second page memory board 13 is transferred by the DMAC board 15 to the frame memory of the FMDA board 16 so that the output image data thus processed is displayed on the main screen of the CRT display 3. Then, the "output image" frame on the sub screen of the CRT display 3 changes to the inverted background and character luminance. When the image data in the buffer memory of the first page memory board 12 is displayed on the main screen of the CRT display 3, the "input image" frame on the sub screen thereof is always at the inverted luminance. When the image data in the buffer memory of the second page memory board 13 is displayed on the main screen of the CRT display 3, the "output image" frame on the sub screen is always at the inverted luminance.

(S10) Checking Allocation End

Step S10 detects whether or not the allocation of image data for all the input units to the output image is finished. If the "input image" frame on the sub screen of the CRT display 3 is not set by using the light pen 4 when the "output image" frame is at the inverted luminance, step S12 is performed. If the "input image" frame is set by using the light pen 4 when the "output image" frame is at the inverted luminance, step S11 is performed.

(S11) Displaying Input Data on CRT Display

Image data in the buffer memory of the first page memory board 12 is again transferred by the DMAC board 15 to the frame memory of the FMDA board 16 so that the image data is displayed on the main screen of the CRT display 3. The "output image" frame on the sub screen of the CRT display 3 is returned to the normal luminance, and the "input image" frame is changed to the inverted luminance. Steps S4 through S9 are repeatedly performed until the answer to step S10 is affirmative.

(S12) Checking Input Data End

Step S12 detects whether or not all the input units which should be inserted to the output image are processed. Steps S1 through S10 are repeatedly performed until the answer to the step S12 is affirmative.

(S13) Selecting Output Unit

If the "output units" frame on the sub screen of the CRT display 3 is set by using the light pen 4 when the "output image" frame is at the inverted luminance, the "output units" frame is changed to the inverted luminance. On the main screen of the CRT display 3, a list of output units, which list includes "printer", "image file" and "FAX transmission" appears. If one output unit is selected from the list displayed on the main screen of the CRT display 3 by using the light pen 4, the background and character luminance of the selected frame is inverted. When the "image file" frame is selected, a list of data files appears on the main screen of the CRT display 3 for the selection of the data file. When the "FAX transmission" frame is selected, a list of facsimile transmission parameters (or, a list of designation facsimile telephone numbers) appears for the selection of the designation facsimile.

(S14) Outputting Data To Selected Output Unit

When the "printer" frame is selected in step S13, the image data in the buffer memory of the second page memory board 13 is output to the printer 5 via the SPIF board 14. When the "image file" frame is selected in step S13, the image data in the buffer memory of the second page memory board 13 is output to a designated file of the HDD unit 6 or the ODD unit 7 via the SCSI board 17. When the "FAX transmission" frame is selected in step S13, the image data in the buffer memory of the second page memory board 13 is transferred to the transmission line 9 via the FAX board 19.

If the "output units" frame is selected by using the light pen 4 when the "input image" frame is at the inverted luminance, the image data in the buffer memory of the first page memory board 12 is output to the selected output unit in the same manner as described above in steps S13 and S14.

Next, a description will be given, with reference to FIGS. 6A through 8B, of the synthesizing process for synthesizing two kinds of input data from different input units so that a composite image is recorded or printed.

Figure 6A:
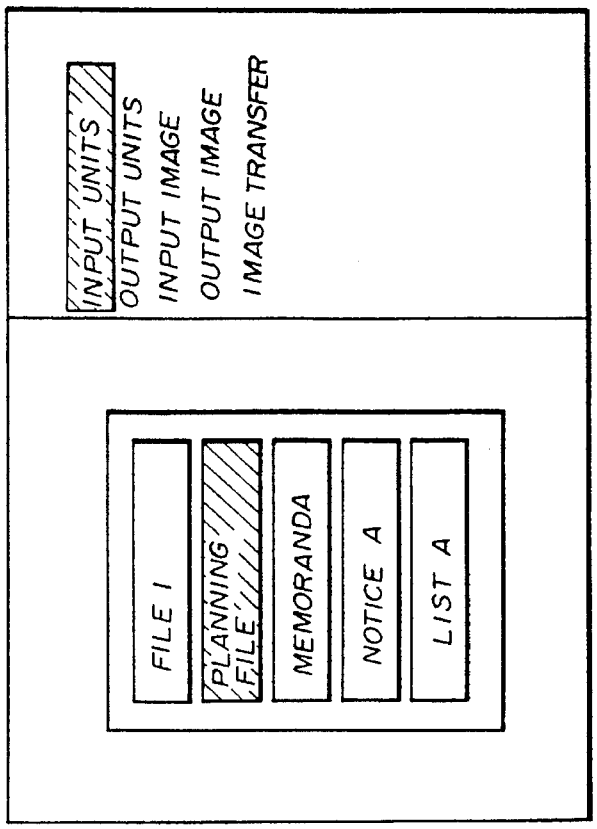

The "input units" frame on the sub screen of the CRT display 3 is selected by using the light pen 4. The controller 1 of the image processing apparatus allows the selected "input units" frame to be at the inverted luminance. The other frames on the sub screen of the CRT display 3 remain at the normal luminance. After the "input units" frame is selected, a list of input units appears on the main screen of the CRT display 3 for the selection of one input unit. The input unit list includes, for example, "scanner data", "AI data", "FAX data", "wordprocessor data", and "image file data" as described above. The "wordprocessor data" is selected from the list by using the light pen 4. The luminance of the "wordprocessor data" frame on the main screen of the CRT display 3 is inverted. FIG. 6A shows the screen of the CRT display 3 at this time.

Figure 6B:
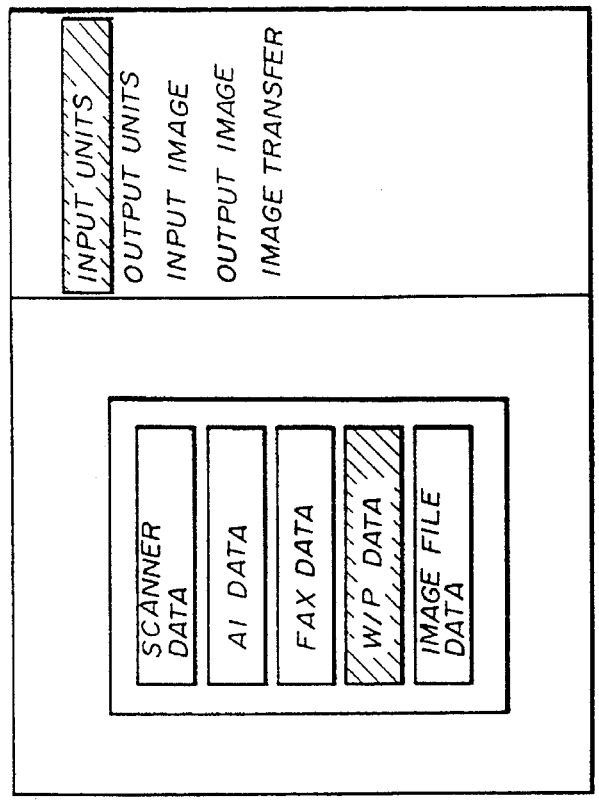

After the "wordprocessor data" is selected, the controller 1 reads a list of data files from a floppy disk inserted in the FDD unit 8, so that the list of data files appears on the main screen of the CRT display 3. If a "planning file" from the data file list is a desired input data, a "planning file" frame is selected by using the light pen 4. FIG. 6B shows the screen of the CRT display 3 at this time.

The controller 1 reads out the text data of the planning file from the floppy disk of the FDD unit 8 so that the processed data is produced in accordance with the text data from the FDD unit 8. The controller 1 transfers the processed data to the buffer memory of the first page memory board 12 by using the FDC board 18. The controller 1 transfers the processed data to the frame memory of the FMDA board 16 so that the data of the planning file is displayed on the main screen of the CRT display 3. The luminance of the "input image" frame on the sub screen of the CRT display 3 is inverted, and the other frames are at the normal luminance. FIG. 6C shows the screen of the CRT display 3 at this time.

Two points in the input data on the main screen of the CRT display 3 are set by using the light pen 4, and a cursor indicating a rectangular area specified by the two points appears in the input data on the main screen of the CRT display 3. FIG. 6D shows the screen of the CRT display 3 at this time. The start and end addresses of the input data in the buffer memory of the first page memory board 12, corresponding to the rectangular area of the data surrounded by the cursor, are stored in the memory of the CPU board 11.

The "output image" frame on the sub screen of the CRT display 3 is selected by using the light pen 4. The controller 1 allows the "output image" frame to be at the inverted luminance and allows the "input image" frame to be at the normal luminance. The data in the buffer memory of the second page memory board 13 is transferred to the frame memory of the FMDA board 16 so that the data appears on the main screen of the CRT display 3. At the same time, the cursor as shown in FIG. 6D appears there. The buffer memory of the second page memory board 13 at this time contains no data, and the data appearing on the main screen of the CRT display 3 is blank.

Figure 6F:
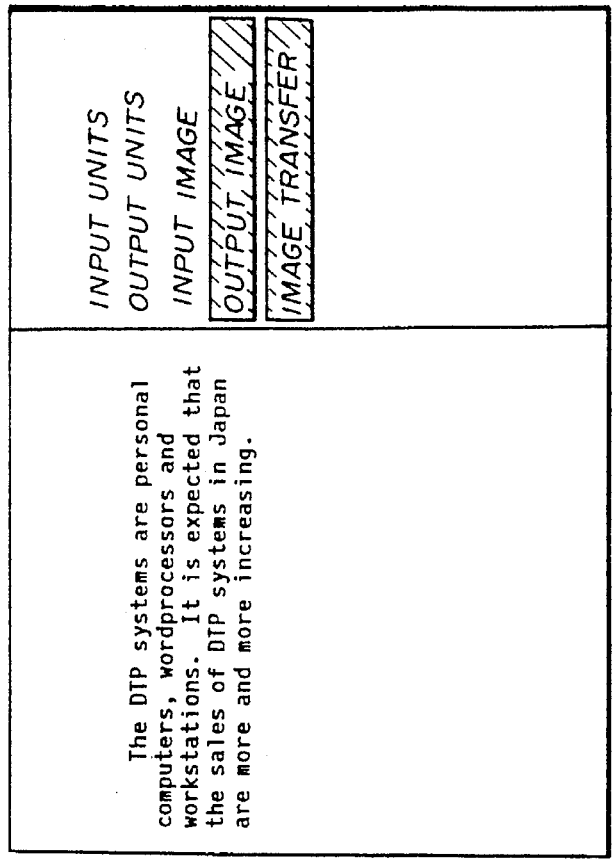
Figure 6E:
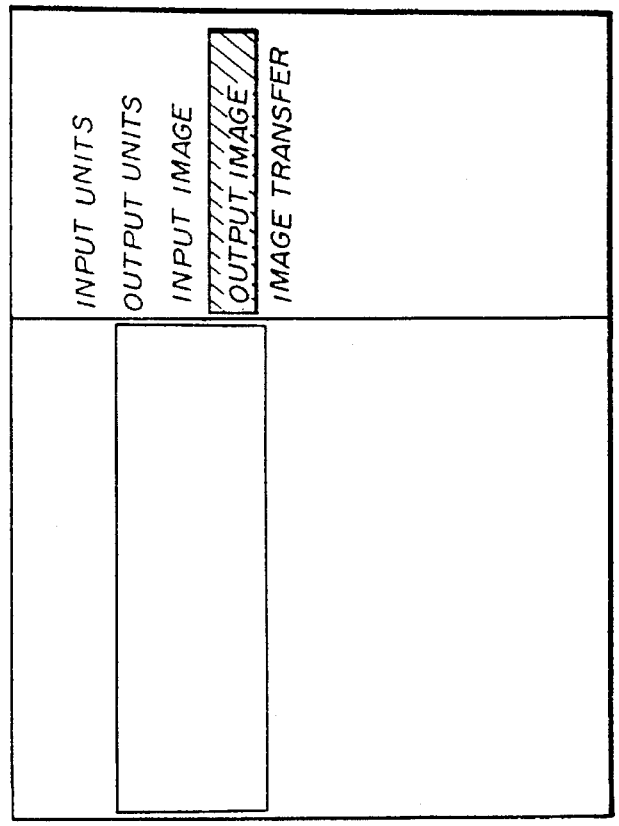

The cursor indicating the rectangular area of the output image (the output region), which cursor is the same as that in the input image (the input region) appears on the main screen of the CRT display 3. By drawing the light pen 4 in contact with the cursor on the main screen of the CRT display 3 to a desired location, the rectangular area of the output image to which the input data is transferred is determined. FIG. 6E shows the screen of the CRT display 3 at this time. The controller 1 stores the start and end addresses of image data in the buffer memory of the second page memory board 13 corresponding to the rectangular area in the memory of the CPU board 11. The size of the output region is the same as the size of the input image.

The "image transfer" frame on the sub screen of the CRT display 3 is selected by using the light pen 4. The controller 1 allows the "image transfer" frame to be at the inverted luminance. At this time, the "output image" and "image transfer" frames are at the inverted luminance. The controller 1 transfers the input data (in the input region) in the buffer memory of the first page memory board 12 to the buffer memory of the second page memory board 13 so that the image data (in the output region) of the buffer memory of the second page memory board 13 is updated.

The controller 1 transfers the image data in the buffer memory of the second page memory board 13 to the frame memory of the FMDA board 16 by means of the DMAC unit 15, so that the image data (in the output region) is displayed on the main screen of the CRT display 3. FIG. 6F shows the screen of the CRT display 3 at this time.

If any modification to the contents of the main screen of the CRT display 3 is needed, the "input image" frame on the sub screen of the CRT display 3 is selected by using the light pen 4. The input text data appears on the main screen of the CRT display 3 as shown in FIG. 6C. It is possible to modify the contents of the main screen of the CRT display 3 by repeating the operations as described above.

Figure 7B:
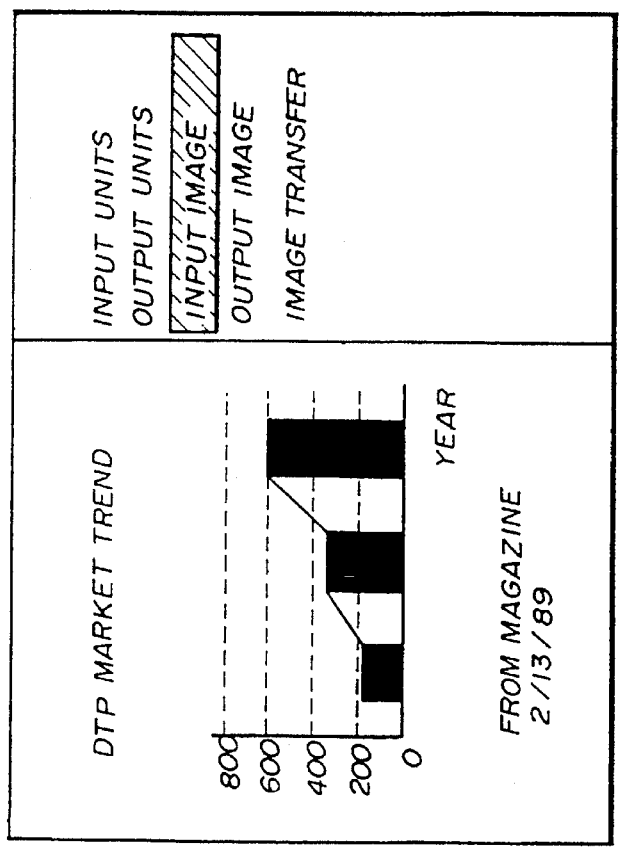
FIGS. 7A through 7F are diagrams for explaining processes performed by the apparatus shown in FIG. 2 in which input data is further read from a facsimile data list so that two pieces of different input data are synthesized.
Figure 7A:
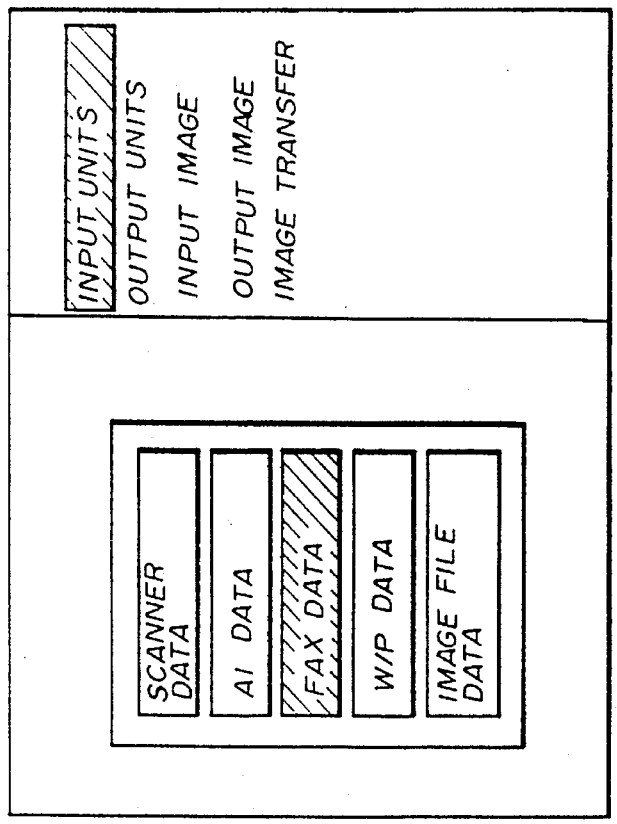

Next, the "input units" frame on the sub screen of the CRT display 3 is selected by using the light pen 4. The luminance of the "input units" frame is inverted, and the list of input units appears on the main screen of the CRT display 3 for the selection of one input unit The "FAX data" for example, is selected by using the light pen 4. The luminance of the "wordprocessor data" frame is inverted. FIG. 7A shows the screen of the CRT display 3 at this time.

The controller 1 allows the FAX board 19 to decode facsimile data received from the transmission line 9 into image data. The controller 1 transfers the image data of the FAX board 19 to the buffer memory of the first page memory board 12 so that the input data in the buffer memory of the first page memory board 12 is updated. The controller 1 transfers the input data in the buffer memory of the first page memory board 12 to the frame memory of the FMDA board 16 so that the input data is displayed on the main screen of the CRT display 3. FIG. 7B shows the screen of the CRT display 3 at this time.

Figure 7D:
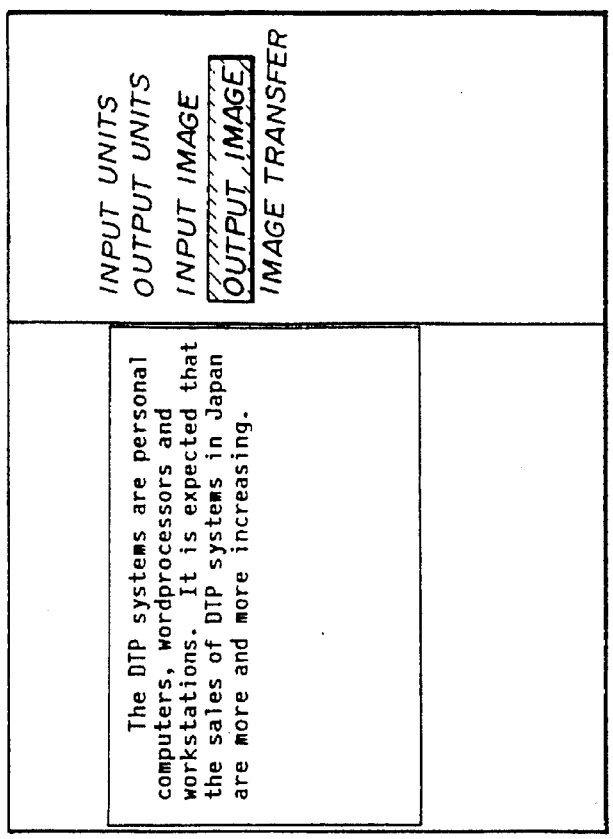
Figure 7C:
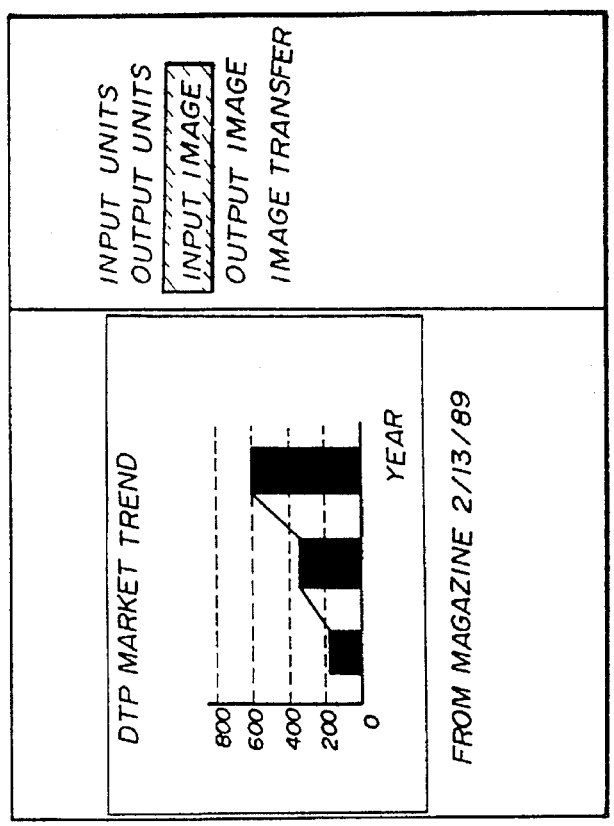

Two points in the input data on the main screen of the CRT display 3 are set by using the light pen 4, and a cursor indicating a rectangular area specified by the two points appears on the main screen of the CRT display 3. FIG. 7C shows the screen of the CRT display 3 at this time. The start and end addresses of the input data in the buffer memory of the first page memory board 12 corresponding to the rectangular area (the input region) are stored in the memory of the CPU board 11.

The "output image" frame on the sub screen of the CRT display 3 is then selected by using the light pen 4. The controller 1 allows the "output image" frame to be at the inverted luminance and allows the "input image" frame to be at the normal luminance. The text data in the buffer memory of the second page memory board 13 is transferred to the frame memory of the FMDA board 16 so that the text data is displayed on the main screen of the CRT display 3. At the same time, the cursor as shown in FIG. 7C appears on the same screen of the CRT display 3. FIG. 7D shows the screen of the CRT display 3 at this time.

Figure 7E:
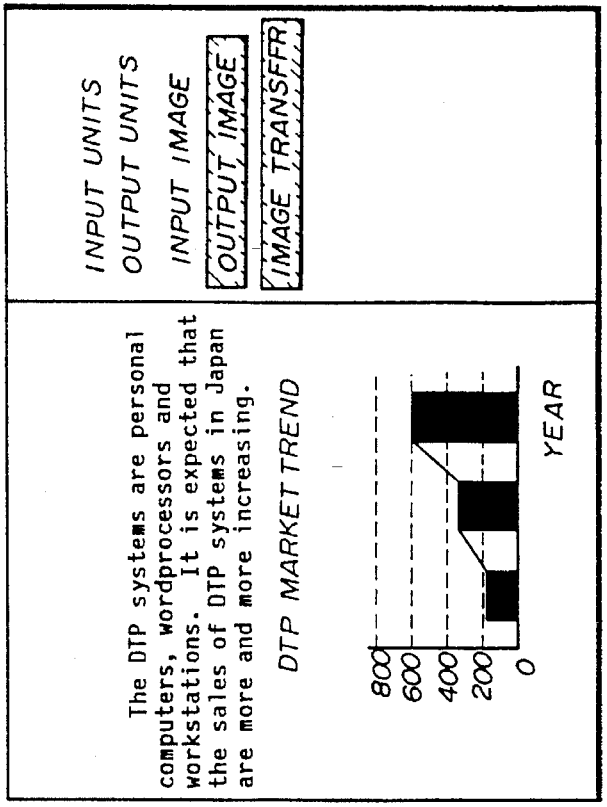

By drawing the light pen 4 in contact with the cursor on the main screen of the CRT display 3 to a desired location, the rectangular area of the output image to which the input data shown in FIG. 7C is transferred is determined. At this time, the size of the rectangular area, specified by the cursor, can be enlarged or reduced by using the light pen 4. FIG. 7E shows the screen of the CRT display 3 at this time. The start and end addresses of image data in the buffer memory of the second page memory board 13 corresponding to the rectangular area thus determined are stored in the memory of the CPU board 11.

The "image transfer" frame on the sub screen of the CRT display 3 is selected by using the light pen 4. The controller 1 allows the "image transfer" frame to be at the inverted luminance. At this time, the "output image" and "image transfer" frames are at the inverted luminance. The controller 1 enlarges or reduces the input data in the buffer memory of the first page memory board 12 (in the input region) in accordance with the ratio of X2/X1 in horizontal direction and in accordance with the ratio of Y2/Y1 in vertical direction. The output data (in the output region) is updated by transferring the enlarged or reduced image data in the buffer memory of the first page memory board 12 to the buffer memory of the second page memory board 13. When the updating of the output data is completed, the "image transfer" frame is changed to the normal luminance.

The controller 1 transfers the output data in the buffer memory of the second page memory board 13 to the frame memory of the FMDA board 16 by means of the DMAC board 15, so that the output data is displayed on the main screen of the CRT display 3.

Figure 7F:
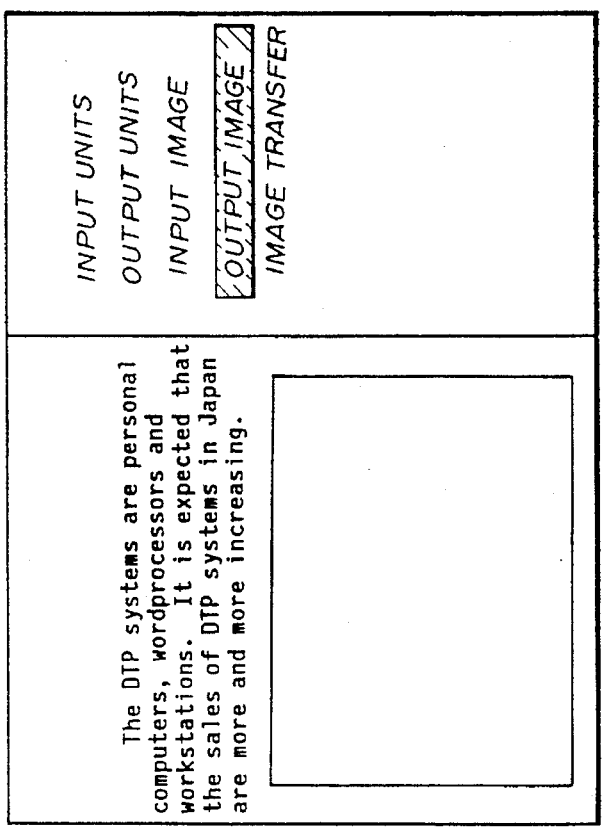

The controller 1 transfers the image data in the buffer memory of the second page memory board 13 to the frame memory of the FMDA board 16 by means of the DMAC unit 15, so that the image data (in the output region) is displayed on the main screen of the CRT display 3. FIG. 7F shows the screen of the CRT display 3 at this time. As shown in FIG. 7F, a composite image in which the input data from the wordprocessor data and the input data from the facsimile data are synthesized appears on the main screen of the CRT display 3.

If any modification to the contents of the main screen of the CRT display 3 is needed, the "input image" frame on the sub screen of the CRT display 3 is selected by using the light pen 4. The input data appears on the main screen of the CRT display 3 as shown in FIG. 7B. It is possible to modify the contents of the main screen of the CRT display 3 by repeating the operations as described above.

Figure 8B:
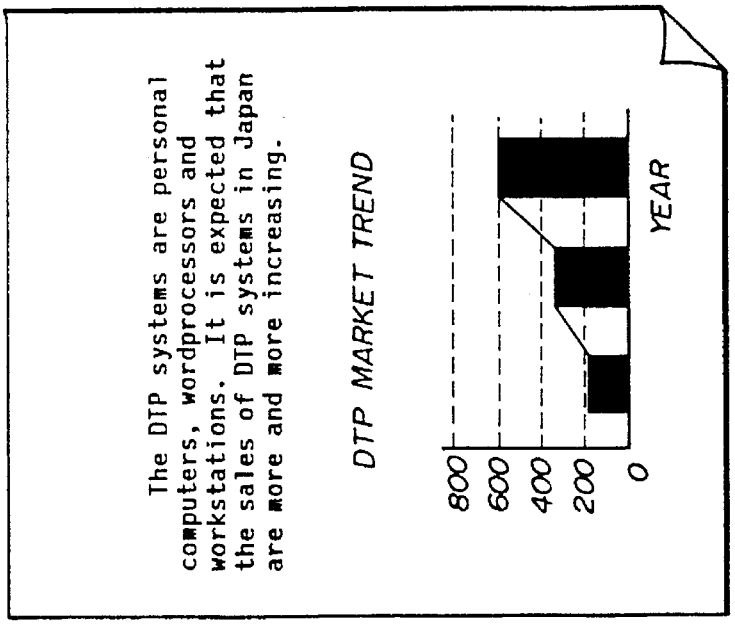
FIGS. 8A and 8B are diagrams for explaining a process in which the composite image shown in FIG. 7F is recorded to a recording sheet.
Figure 8A:
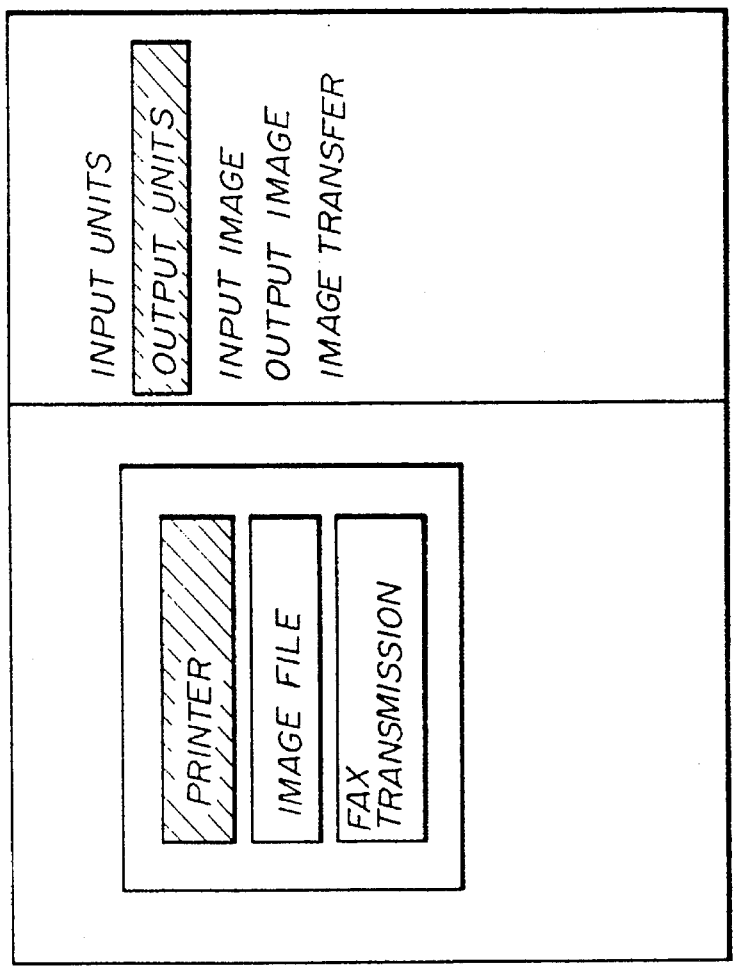

After the composite image with the desired contents is obtained, the "output units" frame on the sub screen of the CRT display 3 is selected by using the light pen 4. The "output units" frame on the sub screen of the CRT display 3 is at the inverted luminance, and the list of output units appears on the main screen of the CRT display 3, as shown in FIG. 8A. When the "printer" frame, for example, is selected from the output unit list by using the light pen 4, the "printer" frame is at the inverted luminance. The controller 1 transfers the output data in the buffer memory of the second page memory board 13 to the printer 5 via the SPIF board 14, so that the composite image is recorded to a recording medium by means of the printer 5. FIG. 8B shows a recording sheet to which the composite image is thus recorded by means of the printer 5.

If there is another input data which should be added to the output image, the above described operations are repeated.

As described in the foregoing, according to the present invention, it is possible to produce a composite image in which several pieces of input data from different input units are processed and the processed data are synthesized. It is possible to output the composite image to a recording medium or an external unit by selecting one of the plurality of output units. It is no longer necessary to produce a hard copy before the synthesizing, and intermediate data read from a hard copy is not used to carry out the synthesizing process. It is thus possible to prevent the picture quality of the output image from deteriorating due to the use of the intermediate data read from a copy of the original data during the synthesizing process.

Further, the present invention is not limited to the above described embodiment, and variations and modifications may be made without departing from the scope of the present invention.

What is claimed is:

1. An image processing apparatus comprising:
   a) a plurality of input units for supplying a plurality of input data of different image information;
   b) input unit selecting means for selecting one input unit from the plurality of input units;
   c) first memory means for storing the input data supplied from said input unit selected by said input unit selecting means;
   d) first display means for displaying the input data stored in said first memory means;
   e) processing means for processing the input data in said first memory means to produce first processed data;
   f) second memory means for storing the processed data, the stored processed data stored in said second memory means having less than a one-page storage size;
   g) second display means for displaying the stored processed data stored in said second memory means;
   h) a plurality of output units for outputting the stored processed data of said second memory means to a recording medium or an external unit;
   i) output unit selection means for selecting one output unit from the plurality of output units; and
   j) control means, including:
      1) means for repeating said selecting one input unit by said input unit selecting means and said storing of the input data by said first memory means, so that said processing means produces second or more processed data;
      2) means for allowing said second or more processed data to be stored in said second memory means so that a composite image containing said first and said second or more processed data from said second memory means is supplied to said output unit selected by said output unit selecting means;
      3) means for receiving from said second display means an output range setting data which specifies start and end addresses of each of said first and said second or more processed data in said second memory means, wherein said output range setting data is input by an operator on said second display means and is stored in said control means; and
      4) means for allowing each of said first and said second or more processed data to be stored in said second memory means in accordance with the received output range setting data.

2. An image processing apparatus according to claim 1, wherein at least one of said plurality of output units is a printer interface unit connected to a printer for recording said composite image containing the pieces of processed data of the second memory means to a recording sheet, said printer interface unit being linked to said control means via a bus.

3. An image processing apparatus according to claim 1, wherein said first memory means is a first page memory board linked to said control means via a bus, said second memory means is a second page memory board linked to said control means via the bus, and said second display means is a frame memory unit connected to a cathode ray tube display unit, said frame memory unit being linked to said control means via the bus.

4. An image processing apparatus according to claim 1, wherein at least one of said plurality of output units is a facsimile interface unit for transforming the processed data into facsimile data and for transmitting said facsimile data to an external facsimile terminal via a transmission line, said facsimile interface unit being linked to said control means via a bus.

5. An image processing apparatus according to claim 1, wherein at least one of said plurality of input units is a facsimile interface unit for receiving facsimile data from an external facsimile terminal via a transmission line, and for transforming the facsimile data into the input data, said facsimile interface unit being linked to said control means via a bus.

6. An image processing apparatus according to claim 1, wherein at least one of said plurality of output units is a file storage unit for recording the processed data to a magnetic or optic storage medium by storing a data file of the processed data in said magnetic or optic storage medium, said file storage unit being linked to said control means via a bus.

7. An image processing apparatus according to claim 6, wherein at least one of said plurality of input units is a file storage unit for reading input data from a magnetic or optic storage medium in which the processed data of the second memory means is stored as a data file.

* * * * *